United States Patent
Vets et al.

(10) Patent No.: US 12,025,179 B2
(45) Date of Patent: Jul. 2, 2024

(54) SEGMENTAL THRUST BEARING

(71) Applicants: ZF Friedrichshafen AG, Friedrichshafen (DE); ZF Wind Power Antwerpen N.V., Lommel (BE)

(72) Inventors: Simon Vets, Friedrichshafen (DE); Koen Krieckemans, Noorderwijk (BE); Nurhan Kavas, Friedrichshafen (DE); Robby Popowicz, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 247 days.

(21) Appl. No.: 17/613,095

(22) PCT Filed: Mar. 5, 2020

(86) PCT No.: PCT/EP2020/055765
§ 371 (c)(1),
(2) Date: Nov. 22, 2021

(87) PCT Pub. No.: WO2020/233847
PCT Pub. Date: Nov. 26, 2020

(65) Prior Publication Data
US 2022/0205479 A1     Jun. 30, 2022

(30) Foreign Application Priority Data
May 22, 2019   (DE) ..................... 10 2019 207 500.2

(51) Int. Cl.
*F16C 17/06* (2006.01)
*F16C 17/04* (2006.01)
*F16C 33/10* (2006.01)

(52) U.S. Cl.
CPC .......... *F16C 17/065* (2013.01); *F16C 17/047* (2013.01); *F16C 33/1065* (2013.01);
(Continued)

(58) Field of Classification Search
CPC ...... F16C 17/047; F16C 17/06; F16C 17/065; F16C 33/1045; F16C 33/106;
(Continued)

(56) References Cited

U.S. PATENT DOCUMENTS

| 1,767,238 A | 6/1930 | Howarth |
| 3,784,266 A | 1/1974 | Parlevliet |

(Continued)

FOREIGN PATENT DOCUMENTS

| CN | 102362086 A | 2/2012 |
| CN | 106574664 A | 4/2017 |

(Continued)

*Primary Examiner* — Alan B Waits
(74) *Attorney, Agent, or Firm* — LEYDIG, VOIT & MAYER, LTD.

(57) ABSTRACT

A thrust bearing includes two physically separate one-piece segments. At least one segment has a wedge-shaped surface serving as a sliding surface. An alternative thrust bearing includes precisely one segment of a one-piece design. The segment is interrupted along its course around an axis of rotation of the thrust bearing. The segment has a wedge-shaped surface serving as a sliding surface.

6 Claims, 2 Drawing Sheets

(52) U.S. Cl.
CPC ........ *F16C 33/1075* (2013.01); *F16C 33/108* (2013.01); *F16C 33/1085* (2013.01)

(58) Field of Classification Search
CPC .............. F16C 33/1065; F16C 33/1075; F16C 33/108; F16C 33/26; F16C 33/1085
See application file for complete search history.

(56) References Cited

U.S. PATENT DOCUMENTS

| | | | |
|---|---|---|---|
| 5,028,148 A * | 7/1991 | Kanamaru | F16C 33/1075 384/279 |
| 8,657,498 B2 * | 2/2014 | Cooley | F16C 17/028 384/93 |
| 8,668,388 B1 * | 3/2014 | Peterson | F16C 33/26 384/42 |
| 9,732,791 B1 * | 8/2017 | Gonzalez | F16C 33/043 |
| 10,393,178 B2 | 8/2019 | Henssler et al. | |
| 2010/0129212 A1 * | 5/2010 | Berger | F01D 25/16 29/889.2 |
| 2012/0128283 A1 | 5/2012 | Kaikogi et al. | |
| 2013/0192899 A1 | 8/2013 | Cooley et al. | |
| 2013/0313023 A1 * | 11/2013 | Cooley | F16C 33/1075 175/107 |
| 2014/0102810 A1 * | 4/2014 | Peterson | F16C 17/06 175/426 |
| 2016/0010684 A1 | 1/2016 | Gauger et al. | |
| 2016/0226258 A1 | 8/2016 | Giertz | |
| 2017/0284461 A1 | 10/2017 | Hammerschmidt et al. | |
| 2019/0032708 A1 | 1/2019 | Gust et al. | |

FOREIGN PATENT DOCUMENTS

| | | |
|---|---|---|
| CN | 109707728 A | 5/2019 |
| DE | 3337749 A1 | 5/1985 |
| DE | 4217268 A1 | 12/1993 |
| DE | 102008046946 A1 | 3/2010 |
| DE | 102013219002 A1 | 3/2015 |
| DE | 102015211470 A1 | 12/2016 |
| WO | WO 2017042322 A1 | 3/2017 |

* cited by examiner

SEGMENTAL THRUST BEARING

CROSS REFERENCE TO RELATED APPLICATIONS

This application is a U.S. National Phase application under 35 U.S.C. § 371 of International Application No. PCT/EP2020/055765, filed on Mar. 5, 2020, and claims benefit to German Patent Application No. DE 10 2019 207 500.2, filed on May 22, 2019. The International Application was published in German on Nov. 26, 2020 as WO 2020/233847 A1 under PCT Article 21(2).

FIELD

The disclosure relates to thrust bearings having at least two physically separate segments and to thrust bearings having one segment.

BACKGROUND

Publication DE 10 2016 219 002 A1 discloses thrust bearings for a planet gear, which are secured against rotation by positive locking. In each case, two thrust bearings for a planet gear are different from each other. Thrust bearings of the same design on the two sides of a planet gear cannot be used, due to steps present in the planet pins.

In addition, so-called tilting-pad bearings and thrust bearings with wedge-shaped surfaces (tapered land) are known from the prior art.

SUMMARY

In an embodiment, the present disclosure provides a thrust bearing that includes two physically separate one-piece segments. At least one segment has a wedge-shaped surface serving as a sliding surface. In an alternative embodiment, the present disclosure provides a thrust bearing that includes precisely one segment of a one-piece design. The segment is interrupted along its course around an axis of rotation of the thrust bearing. The segment has a wedge-shaped surface serving as a sliding surface.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
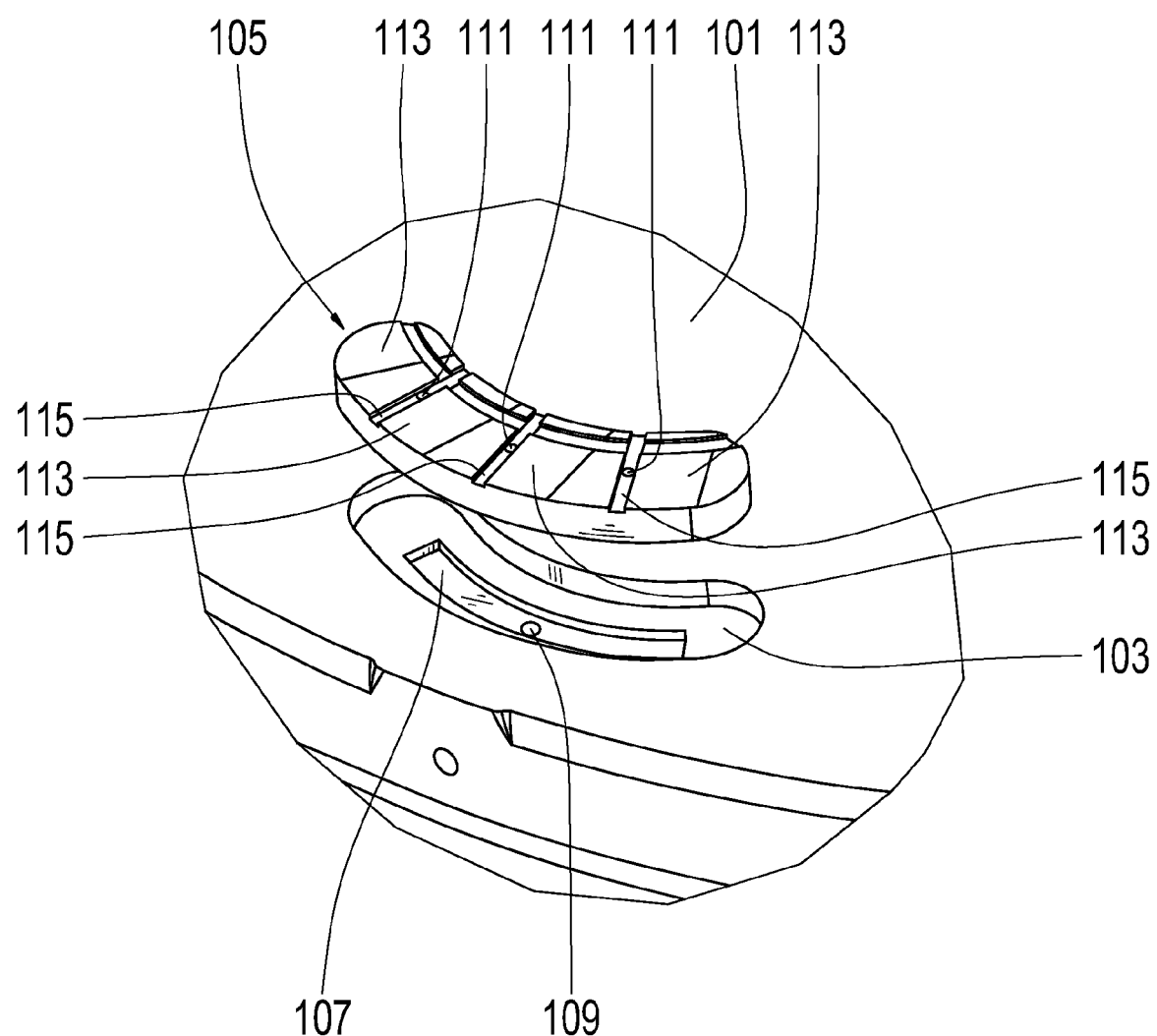
FIG. 1 shows a segmented thrust bearing with wedge-shaped surfaces.

The present disclosure provides thrust bearings that do not have the disadvantages inherent in the solutions known from the prior art. In particular, the bearings should be inexpensive to manufacture and assemble.

A thrust bearing refers to a plain bearing that is designed to absorb forces that run parallel to an axis of rotation of the plain bearing. It is characterized by being able to absorb axial forces—that is, forces running parallel to the axis of rotation—exclusively in one direction. It cannot absorb any axial forces running in the opposite direction. Means that absorb axial forces running in the opposite direction form another thrust bearing.

A first thrust bearing according to the disclosure has at least two, preferably at least three, four or five physically separate, in each case one-piece segments. Each individual segment of the thrust bearing is thus designed in one piece. In each case, two of the segments are physically separated from each other; that is to say, they are separate pieces. In particular, no two segments are integrally connected to each other. Moreover, the segments are preferably arranged separately from each other, so that no two segments touch each other.

According to the disclosure, one or more, preferably at least two, three, four or five segments of the first thrust bearing each have one or more wedge-shaped surfaces.

A second thrust bearing according to the disclosure has exactly one segment. This is of a one-piece design.

According to the disclosure, the segment is interrupted along its course around an axis of rotation of the thrust bearing. This means that the segment does not run unbroken around the axis of rotation. Instead, the course of the segment is interrupted by a gap that is free of the segment. In particular, neither the segment nor a part of the segment is rotationally symmetrical—neither with respect to the axis of rotation nor to another axis.

The wedge-shaped surfaces mentioned above each form a sliding surface. This means that they are designed to form a sliding-surface pair with a common, preferably circular sliding surface. The two sliding surfaces of a sliding-surface pair are rotatable relative to each other and slide against each other during a rotation. A gap between the sliding surfaces is preferably filled with lubricant so that liquid or mixed friction occurs between the sliding surfaces.

The sliding surfaces of a sliding-surface pair of a thrust bearing are designed to transfer forces to each other at least in the axial direction. A first sliding surface of a sliding-surface pair is therefore designed to transfer forces in a specific axial direction to the second sliding surface of the sliding-surface pair. Conversely, the second sliding surface is designed to transfer to the first sliding surface forces that run opposite thereto in the axial direction.

The wedge-shaped surfaces of the thrust bearings are functionally identical to the wedge-shaped surfaces of conventional tapered-land bearings. Accordingly, the shape of the wedge-shaped surfaces of a conventional tapered-land bearing can be transferred to the wedge-shaped surfaces of the thrust bearing. This is a surface that is preferably planar to the wedge-shaped surfaces and is tilted with respect to a plane extending radially, that is orthogonally, to the axis of rotation of the plain bearing. A surface tilted with respect to a plane runs antiparallel to the plane. An axis about which the plane is tilted runs at least partially, preferably exclusively in a radial direction. In the case of an axis running at least partially radially, a direction vector of the course of the axis is radially oriented. The wedge-shaped surfaces each preferably enclose an acute angle with the plane.

The individual segments of the thrust bearings can be mounted very easily. This is particularly advantageous in the case of large bearings. Since each individual segment is comparatively small, materials intended for smaller plain bearings can also be used. In particular, materials for bearings in large-scale industrial production can be used with corresponding cost advantages.

In a preferred development, one or more, preferably all of the segments have at least two, preferably three, four or five wedge-shaped surfaces.

In a further preferred development, the wedge-shaped surfaces are rotationally symmetrical to each other with respect to the axis of rotation of the plain bearing. The wedge-shaped surfaces can thus be mapped onto each other by rotation about the axis of rotation of the plain bearing by one or more angles of rotation.

In a preferred development, a groove runs between each two of the wedge-shaped surfaces. The groove preferably runs at least partially, preferably completely radially with respect to the axis of rotation of the thrust bearing.

The idea underlying the disclosure can be realized by the at least one or precisely one segment having at least one tilt segment instead of the at least one wedge-shaped surface. The above statements concerning the wedge-shaped surfaces apply mutatis mutandis to the tilt segments.

In a further preferred development, one or more, preferably all of the segments of the thrust bearing have in each case at least one hole for the oil supply. The at least one hole is preferably a through-hole, which extends in particular into a groove running between two of the wedge-shaped surfaces.

The thrust bearing is preferably further formed with a carrier that can be rotatably mounted. The carrier is preferably a one-piece component. One or more, preferably all of the segments are rigid—in other words, fixed in the carrier without the possibility of a relative movement. The fixing is preferably effected by positive locking.

In a preferred development, the segments are fixed by means of recesses in the carrier. The carrier thus has one or more recesses for receiving one segment in each case. The segments are inserted into the recesses in such a way that a positive-locking connection is created between a segment and a recess. The recesses are formed as a negative form of a segment in each case.

The carrier is preferably further formed with at least one lubricant line that opens into the recess. The lubricant line thereby communicates with the hole in a lubricant-conducting manner. In this way, lubricant can be introduced into the thrust bearing.

The thrust bearing according to the disclosure and its preferred developments are particularly suitable for the mounting of a planet gear in a planet carrier.

For mounting the planet gear, preferably two thrust bearings are provided, which are located on opposite end faces of the planet gear. The end faces each form sliding-surface pairs together with the wedge-shaped surfaces or tilt segments. One cheek of the planet carrier is preferably used as carrier for the segments of the thrust bearings.

The thrust bearings according to the disclosure make it possible to use identical thrust bearings on both sides of the planet gear.

FIG. 1 shows a planet carrier 101. Its cheek has a recess 103. The recess 103 is a negative form of a thrust-bearing segment 105. If the thrust-bearing segment 105 is inserted into the recess 103, it is fixed in a positive-locking manner by the latter.

At the bottom of the recess 103, there is a groove 107. A lubricant line 109 opens into the groove 107.

The thrust-bearing segment 105 has through-holes 111 running in the axial direction. Towards one side, the through-holes 111 open into a bearing gap, towards the other side into the groove 107. In this way, a lubricant-conducting connection is established between the lubricant line 109 and the through-holes 111.

The thrust-bearing segment 105 is provided with wedge-shaped surfaces 113. Grooves 115 run between the wedge-shaped surfaces 113. Through-holes 111 open into these.

The wedge-shaped surfaces 113 together with a further sliding surface, for example an end face of a planet gear, form the aforementioned bearing gap.

Figure 2:
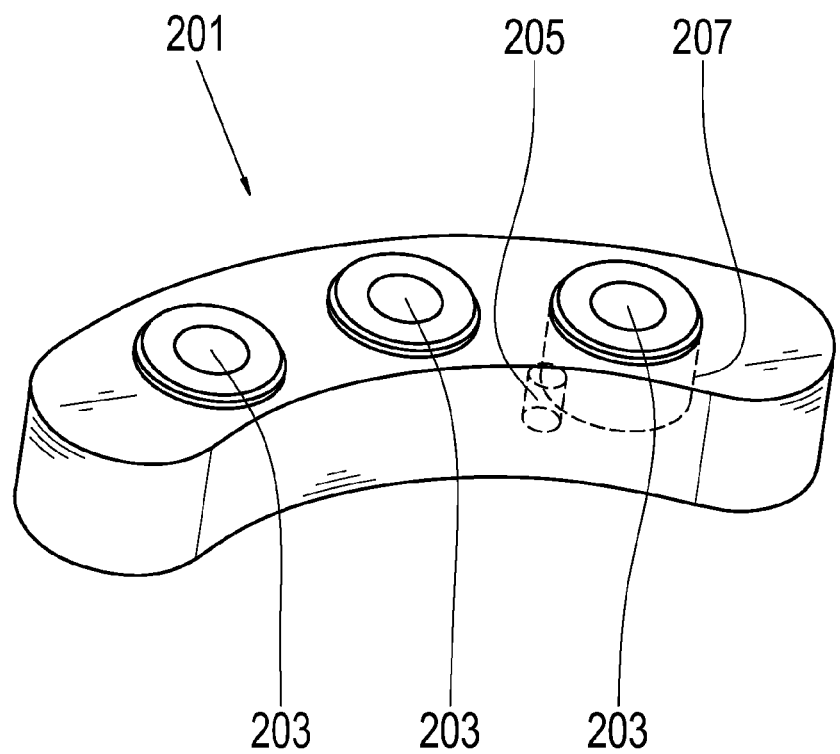
FIG. 2 shows a segmented thrust bearing with tilt segments.

The thrust-bearing segment 201 shown in FIG. 2 corresponds in its basic form to the thrust-bearing segment 105 shown in FIG. 1. Instead of the wedge-shaped surfaces 113, however, it has tilt segments 203. Lubrication is effected via through-holes 205, which in each case open into a recess 207, by means of which the respective tilt segment 203 is fixed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Planet carrier
103 Recess
105 Thrust-bearing segment
107 Groove
109 Lubricant line
111 Through-hole
113 Wedge-shaped surface
115 Groove
201 Thrust-bearing segment
203 Tilt segment
205 Thrust-bearing segment
207 Recess

The invention claimed is:
1. A thrust bearing, comprising:
two physically separate one-piece segments, wherein at least one segment has a wedge-shaped surface serving as a sliding surface; and
a carrier,
wherein the at least one segment is rigidly fixed in the carrier, wherein the carrier forms a recess, wherein the recess fixes the at least one segment in a positive-locking manner, and wherein the carrier forms at least one lubricant line opening into the recess, wherein the lubricant line is in lubricant-conducting connection with a hole in the at least one segment, the hole being configured to supply oil.

2. The thrust bearing according to claim 1, wherein at least one of the two segments has at least two wedge-shaped surfaces.

3. The thrust bearing according to claim 2, wherein the wedge-shaped surfaces are rotationally symmetrical to each other with respect to an axis of rotation of the thrust bearing.

4. The thrust bearing according to claim 2, wherein a groove runs between the at least two wedge-shaped surfaces.

5. The thrust bearing according to claim 4, wherein the hole configured to supply oil is arranged in the groove.

6. A thrust bearing comprising:
precisely one segment of a one-piece design; and
a carrier, wherein the segment is interrupted along a course of the segment around an axis of rotation of the thrust bearing,
wherein the segment has a wedge-shaped surface serving as a sliding surface,
wherein the segment is rigidly fixed in the carrier,
wherein the carrier forms a recess, wherein the recess fixes the segment in a positive-locking manner, and
wherein the carrier forms at least one lubricant line opening into the recess, wherein the lubricant line is in lubricant-conducting connection with a hole in the segment, the hole being configured to supply oil.

* * * * *